Feb. 20, 1962 D. H. BROWN ET AL 3,022,235
CONTROL SYSTEM
Filed Oct. 31, 1956 2 Sheets-Sheet 1

Inventors:
Dale H. Brown
David W. Leiby
by Leonard B. Mackey
Their Attorney.

Feb. 20, 1962     D. H. BROWN ET AL     3,022,235
CONTROL SYSTEM

Filed Oct. 31, 1956     2 Sheets-Sheet 2

Inventors
Dale H. Brown,
David W. Leiby, by Leonard B. Mackey
Their Attorney.

United States Patent Office 3,022,235
Patented Feb. 20, 1962

3,022,235
CONTROL SYSTEM
Dale Henry Brown, Scotia, and David Wilbur Leiby, Schenectady, N.Y., assignors to General Electric Company, a corporation of New York
Filed Oct. 31, 1956, Ser. No. 619,551
7 Claims. (Cl. 204—154.2)

This invention relates to a control system for fluid power systems having both a high pressure and a low pressure cycle.

While the practice of this invention is subject to a wide variety of modifications and variations, it is suited for use with boiling water type nuclear reactors for supplying power to turbine systems and is particularly described in this connection.

In boiling water reactors, water cools the reactor and slows down or moderates neutrons to increase the probability of occurrence of a fission reaction. A portion of the water is converted into steam within the reactor. Steam is caused to flow directly from the reactor to the turbine; or the heat energy from the reactor, in the form of vapor or water, is converted into steam and then supplied to the turbine; or a combination of these methods may be used for supplying heat energy from the reactor to the turbine.

A boiling water reactor can be designed so that the formation of steam bubbles decreases the atomic ratio of water to fuel. This decreases the amount of moderator in the reactor core and thereby decreases reactivity. Thus, increased reactivity tends to increase heat generation so that more steam bubbles are formed and these bubbles tend to decrease reactivity. Such a reactor fails safe and is said to be self-regulating. The control system of this invention is particularly described in connection with such a self-regulating boiling reactor system.

A more complete discussion of boiling reactors and their theory of operation appears in an article by Samuel Untermyer, II, in Nucleonics, volume 12, No. 7, July 1954, pages 43 to 47.

If a self-regulating boiling reactor is enclosed in a pressure vessel, an increase in pressure tends to inhibit the formation of steam voids so that the reactor may not be self-regulating. Therefore, it is desirable to maintain substantially constant pressure in the pressure vessel.

However, if the reactor is providing power to a turbine system, changes in turbine load and corresponding changes in turbine throttle valve opening tend to change the pressure in the reactor pressure vessel. Therefore, apparatus must be provided for controlling the reactor reactivity and the reactor pressure to accommodate changes in load.

A customary method of controlling a nuclear reactor is that of varying the position of neutron absorbing control rods. In this manner, reactors subject to changing load demands have been controlled by varying the position of control rods to vary the reactivity of the reactor and control the reactor pressure vessel pressure. However, this method of control generally involves complicated and power consuming apparatus.

Thus, it is apparent that it is particularly desirable that a control system be provided which is suited to control the reactor, in a reactor powered system over a wide range of loads without requiring manipulation of reactor control rods or other conventional reactor controls.

Therefore, it is an object of this invention to provide an improved control system suited for controlling a reactor in a reactor powered system.

An object of this invention is to provide an improved control system for maintaining constant an elastic fluid source pressure.

Another object of this invention is to provide economical means for maintaining a constant pressure in a boiling water reactor during load changes.

In accordance with one aspect of this invention, there is provided a control system adapted for use with a power source providing high pressure and low pressure elastic fluid to a load. The control system includes a low pressure valve responsive to load changes and coupled to control low pressure fluid flow to the load, a high pressure valve responsive to high pressure fluid pressure changes and coupled to control high pressure fluid flow to the load, and means coupling the low pressure valve to the high pressure valve so that the valves operate in accordance with changes in load to maintain a substantially constant power source pressure.

Other objects and important aspects of this invention will be apparent from the claims and the following portions of the specification when read with the accompanying drawings in which:

Figure 1:
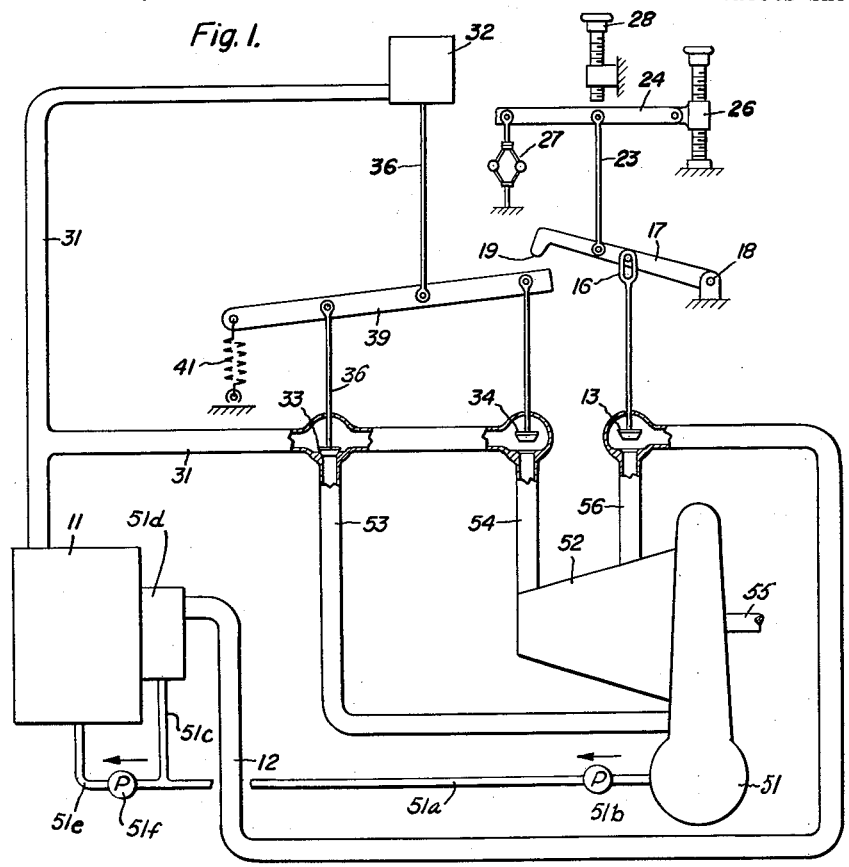
FIGURE 1 is a schematic drawing of a nuclear reactor powered system controlled by the control system of this invention.

FIGURE 1 illustrates a system embodying this invention for use under substantially constant load conditions, such as might be encountered in a public utility power generating station. The system shown in FIGURE 1 incorporates as an example of a power source, a dual cycle boiling water reactor, such as is described and claimed in a patent application by Samuel Untermyer, II, Serial No. 609,242, filed September 11, 1956, and assigned to the same assignee as this application.

In a dual cycle boiling water reactor, the coolant and moderator is not only used as a direct source of power when converted to steam but a portion of the reactor moderator is passed to a flask tank or heat exchanger to produce a secondary source of steam. For instance, in a flash tank, the moderator passes through a multiplicity of jets which reduce the pressure and form low pressure steam. The remaining water which does not flash into steam is cooled by this steam producing process and is returned to the reactor core below saturation temperature.

Since the water is cooled below the boiling temperature of the water in the reactor, steam is not formed immediately after entry of the water into the reactor. Thus, the introduction of lower temperature water into the reactor tends to lower the percentage of steam voids in the reactor and to increase the reactivity. Increased reactivity results in the production of more heat and tends to increase the pressure in the reactor pressure vessel.

Therefore, it should be understood that in the system shown in FIGURE 1, when more low pressure steam is used, the lowered temperature of the water introduced to the reactor increases reactivity and tends to increase the pressure in the pressure vessel. Conversely, when low pressure steam flow is decreased, the temperature of the returning water is not as low, reactivity remains low or is lowered, and the pressure in the reaction pressure vessel tends to decrease.

In order to simplify the description of this invention, details of the reactor such as control rods, circulating pumps, and instrumentation have not been illustrated. Also, it should be appreciated that the reactor illustrated in FIGURE 1 is started up in a conventional manner and that the general operating level of the reactor is determined by appropriate positioning of the control rods. Once the general operating level is established, the control system of this invention may be used to control the reactor and reactor pressure vessel pressure over a wide range of loads.

In the apparatus illustrated in FIGURE 1, the flash drum or heat exchanger associated with and shown as a part of reactor 11 passes low pressure steam through low pressure line 12 to low pressure turbine valve 13. Low pressure turbine valve 13 is actuated by control arm 17 through link 16 which is formed to permit overtravel of the arm with respect to the closed position of the valve. It will be noted that the control arm 17 is positioned at its one end by the fixed pin 18 and at its other end is formed into contacting pawl 19. Movement of the control arm is responsive to the movement of link 23 suspended from the governor mechanism bar 24. Governor mechanism bar 24 is actuated by governor 27 and adjusted by load-speed selector 26 or starting handwheel 28.

High pressure steam from the reactor is passed through high pressure line 31 to a pressure sensitive device 32 and also to the high pressure by-pass valve 33 and to the high pressure valve 34. The high pressure sensitive device 32 lifts push rod 36 responsive to increases in pressure and lowers push rod 36 responsive to decreases in pressure. The push rod 36 is directly connected to flow splitter arm 39. Arm 39 is pivotally suspended from the push rod 36 and is connected at its left end to a mechanical resistance, in this embodiment, spring 41. At a point along the arm 39, between spring 41 and the point of attachment of rod 36, there is linked the high pressure by-pass valve 33. At the right end of arm 39, there is connected high pressure valve 34. Arm 39 is positioned so that its right end is directly beneath the contacting pawl 19 of control arm 17.

As shown in FIGURE 1, the valve 33 is connected in line 53 to the condenser 51 of the turbine 52. Turbine 52 is connected by shaft 55 to a load, for example, an electric generator. High pressure valve 34 is connected in line 54 to the high pressure stage of the turbine and the low pressure valve 13 is connected in line 56 to intermediate stage of the turbine. As described in the Untermyer application, Serial No. 609,242, the steam condensate from the condenser 51 is pumped through lines 51a, 51c, and 51e by means of pumps 51b and 51f into reactor 11 and secondary steam generator 51d to complete the water circuit.

The apparatus shown in FIGURE 1 is illustrated under typical normal load conditions, during which high pressure by-pass valve 33 is closed, high pressure valve 34 is partially opened and is controlled by the pressure sensitive device 32, and low pressure valve 13 is almost fully opened.

If it is assumed that the turbine load is reduced, the turbine momentarily tends to speed up which causes governor 27 to lower bar 24 and thereby lower control arm 17 to move valve 13 toward a closed position. Because of the reduction in the amount of low pressure steam being taken from the reactor, in such a dual cycle reactor, the reactor power is reduced which tends to lower the pressure of the high pressure steam. The change in pressure causes device 32 to lower the flow splitter arm 39 and partially closes valve 34. By moving the high pressure valve 34 to a more closed position, the flow of high pressure steam to the turbine is reduced and the reactor steam pressure maintained constant. Partial closing of the high pressure valve 34 tends to reduce the speed of the turbine which speed reduction is compensated by the governor 27 acting to move valve 13 to a more open position and maintain the speed of the turbine. Thus, it will be seen that through the cooperating action of the apparatus hereinbefore described, the turbine speed is maintained constant under all load conditions and at the same time the pressure of the reactor steam pressure is maintained constant. Wastage of steam through substantial usage of the by-pass valve is minimized.

Figure 2:
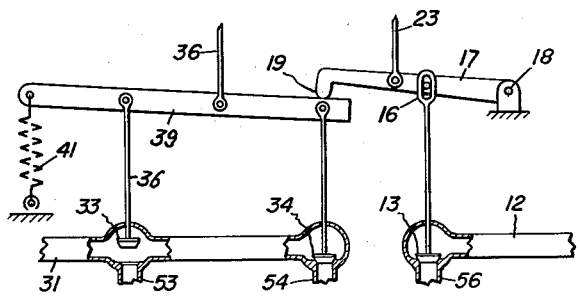
FIGURE 2 is a diagrammatic illustration of the apparatus shown in FIGURE 1 during one operating condition.

Assume now that the turbine load is completely removed in an abrupt fashion, as for instance by a tripping out of the generator driven by the turbine due to a failure in the distribution system of the power plant. As shown in FIGURE 2, the turbine governor drops control arm 17 to a position whereby low pressure valve 13 is fully closed and pawl 19 of arm 17 contacts flow splitter arm 39 and by reason of the over-travel permitted by link 16, arm 17 is free to continue to move to close the valve 34 and rotate arm 39 in a clockwise manner about its point of suspension from the linkage 36 to raise the left end of that arm thereby opening the by-pass valve 33. In this manner, all steam is cut off to the turbine and excess reactor steam pressure is relieved directly to the condenser thereby maintaining the reactor pressure at a constant value. Any momentary increase in reactor pressure causes device 32 to raise arm 39 higher and further opens the by-pass valve 33. Any subsequent reactor pressure drop, through the action of device 32, tends to lower the arm 39 which then rotates in a counterclockwise manner around its right end held in position by the pawl 19 to move the by-pass valve 33 to a less open position, to maintain a constant pressure in the reactor. As a result of the aforementioned abrupt cutoff of steam to the turbine, turbine speed tends to decrease.

Figure 3:
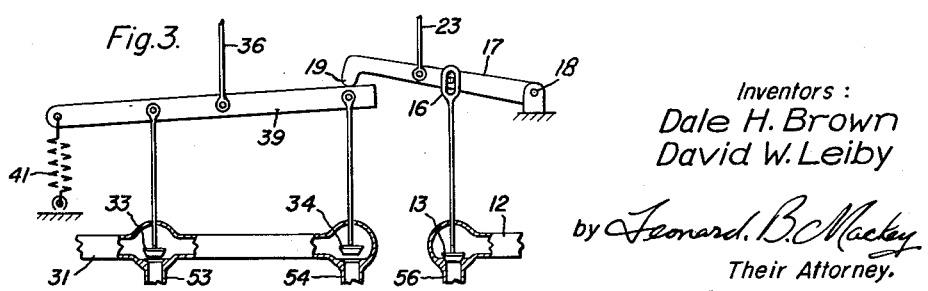
FIGURE 3 is a diagrammatic illustration of the apparatus shown in FIGURE 1 during another operating condition.

The governor 27 acts to maintain the turbine at normal speed without load and as shown in FIGURE 3 the arm 17 is raised by the action of the governor. As a result of the lifting of arm 17, spring 41 causes the arm 39 to rotate in a counterclockwise manner about the point of attachment to link 36 by moving the by-pass valve 33 toward closed position and valve 34 toward open position. FIGURE 3 shows the position of the control apparatus at the point where the valve 33 is partially closed, the valve 34 is partially opened, and the valve 13 is closed.

As load is re-applied to the turbine, the tendency for turbine speed to decrease raises the arm 17 and further moving arm 39 to open high pressure valve 34 and close by-pass valve 33. Further application of load raises the arm 17 to a position which opens low pressure valve 13.

In the event that the operator does not desire to keep the turbine idling during the condition when the load is removed, he manually operates either the load speed selector 26, or the starting handwheel 28 to maintain arm 17 in lowered position. It should also be explained that if the turbine is going to be shut down for a considerable period, the reactor operator then manipulates the control rods to shut down the reactor.

When the turbine is ready to be placed back on the line to carry a load, the reactor operator reactivates the reactor through use of the control rods and when operating pressure is reached, the apparatus assumes the position shown in FIGURE 2 whereby the excess steam from the reactor is by-passed through the valve 33. To commence the turbine operation, the turbine operator turns the starting handwheel 28 which raises the governor mechanism bar 24 which raises the throttle control arm 17 and the apparatus moves from the position shown in FIGURE 2 to a position similar to that shown in FIGURE 3 in which the by-pass valve is partially open and the high pressure valve 34 is partially open.

As an example of the operation of this invention, assume that equipment such as illustrated in FIGURE 1 is operating with a reactor power output of approximately 293,000 kw. With this reactor power output, the turbine generator produces approximately 76,800 kw. The pressure of the high pressure steam is approximately 1,000 pounds per square inch. The steam flow of the high pressure steam is approximately 241 pounds per second and the flow of the low pressure steam is approximately 64.8 pounds per second. The turbine speed may be assumed to be 1,765 r.p.m. If it is assumed that the load demand is abruptly increased to 192,000 kw., at the end of 10 seconds the generator output stabilizes at 192,000 kw. and shortly thereafter the reactor power level stabilizes at 697,000 kw. During the 10 second period, turbine speed decreases to a low of approximately 1,665 r.p.m. and at the end of 10 seconds returns to a substantially constant value of 1,700 r.p.m. During the same 10 second period, the pressure of the high pressure steam momentarily increases to a high of approximately 1,003 pounds per square inch; however, at the end of the 10 second period, the pressure returns to a substantially constant value of 1,000 pounds per square inch. Also, at the end of approximately 40 seconds, high pressure steam flow increases to a constant value of approximately 430 pounds per second and low pressure steam flow increases to a constant value of approximately 360 pounds per second. Low pressure steam pressure steadily drops during the 40 second period to a value of 500 pounds per square inch. The water returning to the reactor drops in temperature from 7° F. below saturation temperature at the beginning of the period to 30° F. below saturation temperature at the end of the period. This change in temperature causes the reactor power to increase. Reactor control rods are not actuated to accommodate this increase in load demand.

Figure 4:
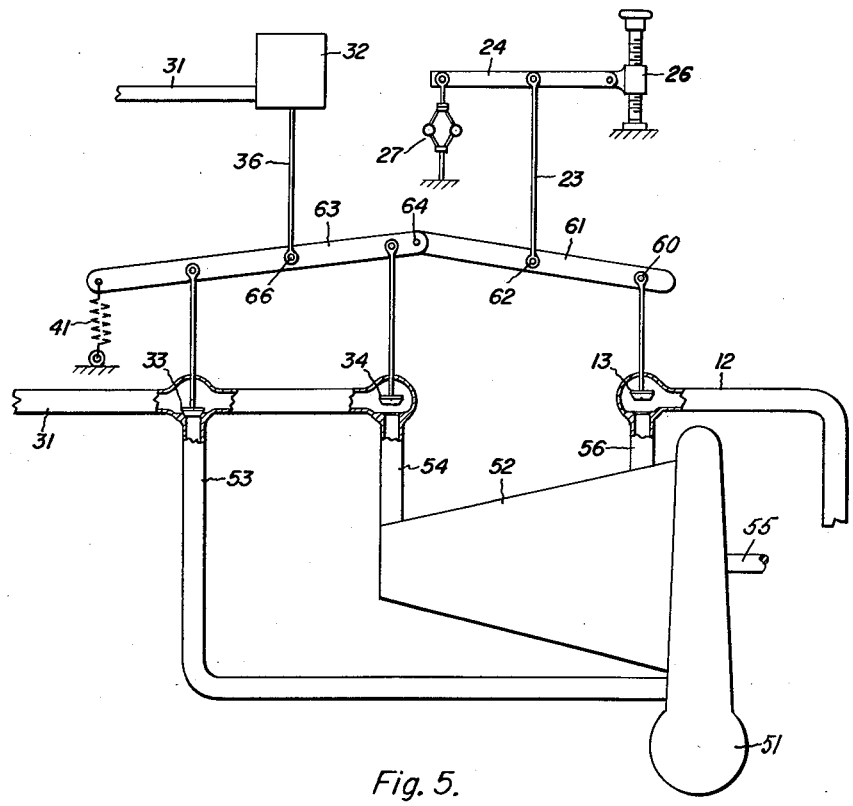
FIGURE 4 is a schematic drawing of another control system embodying the invention in a first operating condition.

The embodiment shown in FIGURE 4 is designed for those installations wherein the turbine load is changed abruptly. For example, in a marine application, abrupt maneuvers are usual and the control system must rapidly and economically accommodate itself to abrupt changes in turbine load. In such installations, it is desirable to eliminate the cooperative readjustment of the pressure regulating mechanism and the turbine governor mechanism. In order to have this cooperative action in the linkage rather than separately in the turbine governor mechanism and in the pressure sensitive device, as is the case of the apparatus described with respect to FIGURE 1, the linkages are interconnected.

As shown in FIGURE 4, low pressure steam is passed through line 12 to low pressure valve 13 which is linked to the right hand end of flow divider arm 61. Arm 61 is pivotally suspended at point 62 from the turbine governor bar 24 by linkage 23 and is pivotally connected at its left end to flow splitter arm 63 at point 64 on the right end of arm 63. High pressure valve 34 is linked to the right end of arm 63 at a point near the arm connection 64. Arm 63 is pivotally suspended from the pressure sensitive device 32 by linkage 36 at a point 66 along the mid-section of arm 63. Spring 41 is linked to the left hand end of arm 63 and provides a downward force. By-pass valve 33 is linked to arm 63 at a point intermediate the attachment of spring 41 and point 66.

In the position of the apparatus as shown in FIGURE 4, the turbine is operating under normal load conditions and is receiving both high pressure steam and low pressure steam with the by-pass valve 33 shut. Assume now that the load which is being driven by this power system is maneuvering and is abruptly reduced from full load to one-third load. Under such a change of load, the turbine tends to speed up and the action of the turbine governor is such that the flow divider arm 61 abruptly drops. Since the point 64, which is the point of connection of the arms 61 and 63, is conditionally fixed by the action of the pressure sensitive device 32 and the spring 41, a sudden lowering by the linkage 23 causes the arm 61 to rotate clockwise about its pivotal point of connection 62 with the linkage 23 thereby closing the low pressure valve 13. If closing of the low pressure valve 13 is not sufficient to reduce the turbine speed, the linkage 23 further forces the arm 61 to a downward position about point 60 which is fixed since valve 13 is closed and the arm rotates in a counterclockwise manner about point 60. Such counterclockwise movement lowers the conditionally fixed point 64 against the force of spring 41 and serves to close the high pressure valve 34 and partially open the by-pass valve 33 by rotating arm 63 about its point of pivotal connection 66 with linkage 36. This results in the condition illustrated in FIGURE 5.

Figure 5:
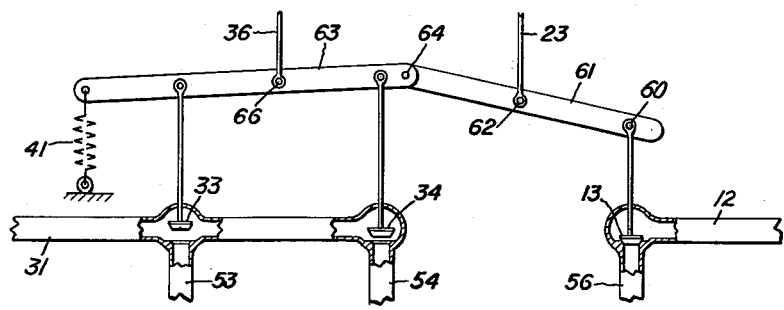
FIGURE 5 is a diagrammatic illustration of the system shown in FIGURE 4 in another operating condition.

Referring now to FIGURE 5 and assuming that this abrupt shutdown is compensated for by the reactor and that the pressure of the high pressure steam tends to drop, the reactor pressure sensitive device 32 then lowers linkage 36 which lowers arm 63. Spring 41 causes the arm 63 to rotate in a counterclockwise manner about point 64 partially closing by-pass valve 33 while high pressure throttle valve 34 remains in its partially opened position as dictated by the governor control. Thus, a readjustment of the governor control is not necessary to recompensate for the change effected by the pressure regulator.

Assume now that the load upon the turbine is increased and that the turbine governor as a result raises the flow divider arm 61. As arm 61 is raised, the downward tension of spring 41 causes the by-pass valve 33 to close by counterclockwise movement of the arm 63 about its pivotal connection 66 and also to open further the valve 34. When the by-pass valve 33 has been fully closed and the turbine governor further raises the arm 61, that arm rotates in a counterclockwise manner about point 64, opening the low pressure valve 13 to admit low pressure steam to the turbine. With the by-pass valve 33 in closed position, pressure sensitive device 32 maintains point 64 in a fixed position so that the turbine governor merely actuates valve 13 for further speed changes without necessitating further compensation of the apparatus.

Thus, load changes are initially accommodated by the low pressure steam valve 13. Subsequently, the valves, pressure sensitive device 32, and turbine governor 27 interact to maintain substantially constant reactor pressure.

It is apparent that the control system of this invention may incorporate coupling, other than the illustrated mechanical linkages, interconnecting the valves, the pressure sensitive device 32, and the turbine governor 27 to maintain a substantially constant power source pressure. For example, electromagnetic coupling means such as servomechanisms may be utilized or coupling apparatus comprising a combination of mechanical linkages and servomechanisms may be utilized without departing from the spirit of this invention.

Also, it is apparent that the control system of this invention is suited for use with reactor power sources other than the illustrated dual cycle boiling reactor power source. For example, the control system of this invention is suited for use with other power sources providing high and low pressure elastic fluid such as steam or other gas to a load. Such power sources include nuclear reactors, fossil fuel power sources, or combinations thereof.

The specific embodiments, described herein, are presented merely as examples of the many forms the practice of this invention may take. It will be apparent to those skilled in the art that this invention may be practiced with a wide variety of apparatus. Therefore, it is intended in the appended claims to cover all modifications and variations that come within the true spirit and scope of this invention.

What is claimed is:
1. A control system for use with a boiling nuclear reactor power source providing high pressure and low pressure elastic fluid to a load, which system comprises a low pressure valve responsive to load changes and coupled to control the flow of low pressure fluid to the load, said low pressure valve tending to move toward more closed and more open positions on load reductions and increases respectively, a high pressure valve responsive to high pressure fluid pressure changes and coupled to control the flow of high pressure fluid to the load, said high pressure valve tending to move toward more closed and more open positions on high pressure fluid pressure decreases and increases respectively, and means coupling the low pressure valve to the high pressure valve so that said valves operate in accordance with load changes to maintain a substantially constant high pressure fluid pressure at said power source.

2. A control system for use with a boiling nuclear reactor power source providing high pressure and low pressure elastic fluid to a load, which system comprises a low pressure valve coupled to control the flow of low pressure fluid to the load, said low pressure valve tending to move toward more closed and more open positions on load reductions and increases respectively, a high pressure valve coupled to control the flow of high pressure fluid to the load, said high pressure valve tending to move toward more closed and more open positions on high pressure fluid pressure decreases and increases respectively, a by-pass valve coupled to by-pass fluid around the load, pressure sensitive means responsive to power source pressure, and correlating means coupled to said pressure sensitive means and to said valves to maintain substantially constant high pressure fluid pressure at said power source.

3. A control system for use with a boiling nuclear reactor power source providing high and low pressure elastic fluid to a load, which system comprises a low pressure valve responsive to load changes and coupled to control the flow of low pressure fluid to the load, said low pressure valve tending to move toward more closed and more open positions on load reductions and increases respectively, a high pressure valve coupled to control the flow of high pressure fluid to the load, said high pressure valve tending to move toward more closed and more open positions on high pressure fluid pressure decreases and increases respectively, a by-pass valve coupled to by-pass fluid around the load, pressure sensitive means responsive to power source pressure and coupled to said high pressure valve and said by-pass valve, and lever means coupled to all of said valves so that load reductions and increases tend to move said high pressure valve toward more closed and more open positions respectively, and tend to move said by-pass valve toward more open and more closed positions respectively.

4. A control system for a boiling nuclear reactor power source providing high pressure elastic fluid and low pressure elastic fluid to a load, said system comprising a high pressure valve coupled to control the flow of high pressure fluid to the load, a low pressure valve coupled to control the flow of low pressure fluid to the load, a by-pass valve coupled to by-pass fluid around the load, a first control arm responsive to load changes coupled to said low pressure valve, said low pressure valve tending to move toward more closed and more open positions on load reductions and increases respectively, a second control arm coupled to said high pressure valve and to said by-pass valve, pressure sensitive means responsive to changes in the pressure of the high pressure elastic fluid coupled to the second control arm, said high pressure valve tending to move toward more closed and more open positions on high pressure fluid pressure decreases and increases respectively, and means coupling said control arms to one another at their adjacent extremities.

5. A control system for a boiling nuclear reactor power source providing high pressure elastic fluid and low pressure elastic fluid to a load, said system comprising a high pressure valve coupled to control the flow of high pressure fluid to the load, a low pressure valve coupled to control the flow of low pressure fluid to the load, a by-pass valve coupled to by-pass fluid around the load, a control arm coupled to said high pressure valve and to said by-pass valve, pressure sensitive means responsive to changes in the pressure of the high pressure elastic fluid coupled to said control arm, said high pressure valve tending to move toward more closed and more open positions on high pressure fluid pressure decreases and increases respectively, and another control arm responsive to load changes coupled to said low pressure valve and positioned to actuate the first-named control arm, said low pressure valve tending to move toward more closed and more open positions on load reductions and increases respectively.

6. In a power system including a boiling nuclear reactor power source providing high pressure elastic fluid and low pressure elastic fluid to a load, the improved control system which comprises a high pressure valve coupled to control the flow of high pressure fluid to the load, a by-pass valve coupled to by-pass high pressure fluid around the load, a pressure sensitive device responsive to pressure changes of the high pressure fluid, a lever coupling the high pressure valve and the by-pass valve and coupled to said pressure sensitive device, said high pressure valve tending to move toward more closed and more open positions on high pressure fluid pressure decreases and increases respectively, a low pressure valve coupled to control the flow of low pressure fluid to the load, another lever coupled near one end to the first-named lever and coupled near the other end to said low pressure valve, and a governor mechanism responsive to load changes in the power system coupled to said other lever, said low pressure valve tending to move toward more closed and more open positions on load reductions and increases respectively.

7. In a dual cycle boiling water reactor power system wherein a dual cycle boiling water nuclear reactor provides high pressure steam and low pressure steam to a load, the improved reactor control system which comprises a high pressure valve coupled to control high pressure steam flow to the load, a low pressure valve coupled to control low pressure steam flow to the load, a by-pass valve coupled to by-pass high pressure steam around the load, a first control means coupled to the low pressure valve to actuate the valve in response to load changes, a second control means coupled near one end to the first control means and to the high pressure valve, a pressure sensitive device responsive to high pressure steam pressure coupled to an intermediate region of said second control means, said second control means being coupled near the other end to a mechanical resistance and to said by-pass valve, said low pressure valve tending to move toward more closed and more open positions on load reductions and increases respectively, said high pressure valve tending to move toward more closed and more open positions on high pressure fluid pressure decreases and increases respectively, the interaction of said valves and control means maintaining said reactor pressure substantially constant over a wide range of load demands.

References Cited in the file of this patent

UNITED STATES PATENTS

| | | |
|---|---|---|
| 1,021,257 | Mix | Mar. 26, 1912 |
| 1,049,809 | Carroll | Jan. 7, 1913 |
| 1,085,157 | Pape | Jan. 27, 1914 |
| 1,154,594 | Rice | Sept. 21, 1915 |
| 1,704,403 | Nash | Mar. 5, 1929 |
| 1,777,461 | Campbell | Oct. 7, 1930 |
| 2,294,753 | Hedman | Sept. 1, 1942 |